US011956869B2

(12) United States Patent
Chou et al.

(10) Patent No.: US 11,956,869 B2
(45) Date of Patent: Apr. 9, 2024

(54) DISPLAY DRIVER CIRCUIT FOR CONTROLLING LED PANEL

(71) Applicant: NOVATEK Microelectronics Corp., Hsin-Chu (TW)

(72) Inventors: Chih-Hsien Chou, Hsinchu (TW); Jhih-Siou Cheng, New Taipei (TW); Jin-Yi Lin, Kaohsiung (TW); Ren-Chieh Yang, Taichung (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 17/964,059

(22) Filed: Oct. 12, 2022

(65) Prior Publication Data

US 2023/0269845 A1 Aug. 24, 2023

Related U.S. Application Data

(60) Provisional application No. 63/312,843, filed on Feb. 23, 2022.

(51) Int. Cl.

| | |
|---|---|
| ***H05B 45/325*** | (2020.01) |
| ***G09G 3/32*** | (2016.01) |
| ***H05B 45/345*** | (2020.01) |
| ***H05B 45/46*** | (2020.01) |
| ***H05B 45/54*** | (2020.01) |

(52) U.S. Cl.
CPC ............. *H05B 45/325* (2020.01); *G09G 3/32* (2013.01); *H05B 45/345* (2020.01); *H05B 45/46* (2020.01); *H05B 45/54* (2020.01)

(58) Field of Classification Search
CPC ...... H05B 45/10; H05B 45/30; H05B 45/345; H05B 45/46; H05B 45/54; H05B 47/10; G09G 3/32
See application file for complete search history.

(56) References Cited

U.S. PATENT DOCUMENTS

| | | | | |
|---|---|---|---|---|
| 2012/0127210 | A1 | 5/2012 | Huang | |
| 2016/0157314 | A1 | 6/2016 | Scott | |
| 2020/0184881 | A1* | 6/2020 | Li | G09G 3/2014 |

FOREIGN PATENT DOCUMENTS

| | | | |
|---|---|---|---|
| CN | 111836432 | A | 10/2020 |
| TW | 201003596 | | 1/2010 |
| TW | 201444408 | A | 11/2014 |
| TW | 201501568 | A | 1/2015 |

* cited by examiner

*Primary Examiner* — Jimmy T Vu
(74) *Attorney, Agent, or Firm* — Winston Hsu

(57) ABSTRACT

A display driver circuit for controlling a display panel having a plurality of light-emission diode (LED) strings includes a plurality of current regulators and a control circuit. Each of the plurality of current regulators is configured to control one of the plurality of LED strings. The control circuit, coupled to the plurality of current regulators, is configured to generate a plurality of pulses in a plurality of pulse width modulation (PWM) signals and output each of the plurality of PWM signals to a respective current regulator among the plurality of current regulators. Wherein, the plurality of pulses are scrambled.

17 Claims, 8 Drawing Sheets

DISPLAY DRIVER CIRCUIT FOR CONTROLLING LED PANEL

CROSS REFERENCE TO RELATED APPLICATIONS

This application claims the benefit of U.S. Provisional Application No. 63/312,843, filed on Feb. 23, 2022. The content of the application is incorporated herein by reference.

BACKGROUND OF THE INVENTION

1. Field of the Invention

The present invention relates to a display driver circuit, and more particularly, to a display driver circuit for controlling a light-emitting diode (LED) panel.

2. Description of the Prior Art

With the increasingly advanced light-emitting diode (LED) display technology, high refresh rate and high resolution of LED displays composed of increasing numbers of LEDs have become the trend in this field. The increasing number of LEDs is usually accompanied by high-frequency switching in the pulse width modulation (PWM) control, resulting in heavier loading on the power converter used to supply power and voltage to the LED strings on the panel.

For example, originally a PWM signal has one pulse in each frame period. In order to increase the refresh rate, a PWM signal may have multiple pulses in each frame period. In addition, with the increasing panel size, there may be more LEDs deployed on the panel; hence, the power converter is requested to simultaneously and synchronously output more PWM signals to drive the increasing number of LEDs.

As can be seen, with the advancement of LED display technology, the number of PWM signals and the switching frequency of the PWM signals are both increasing, which introduces heavier loading on the power converter. The high-frequency switching may also increase the electromagnetic interference (EMI) generated by the display system. Thus, there is a need for improvement over the prior art.

SUMMARY OF THE INVENTION

It is therefore an objective of the present invention to provide a novel driving scheme for controlling the light-emitting diode (LED) display panel, in order to solve the abovementioned problems.

An embodiment of the present invention discloses a display driver circuit for controlling a display panel having a plurality of LED strings. The display driver circuit comprises a plurality of current regulators and a control circuit. Each of the plurality of current regulators is configured to control one of the plurality of LED strings. The control circuit, coupled to the plurality of current regulators, is configured to generate a plurality of pulses in a plurality of pulse width modulation (PWM) signals and output each of the plurality of PWM signals to a respective current regulator among the plurality of current regulators. Wherein, the plurality of pulses are scrambled.

Another embodiment of the present invention discloses a display driver circuit for controlling a display panel having a plurality of LED strings. The display driver circuit comprises a plurality of current regulators and a control circuit.

Each of the plurality of current regulators is configured to control one of the plurality of LED strings. The control circuit, coupled to the plurality of current regulators, is configured to generate a plurality of PWM signals and output each of the plurality of PWM signals to a respective current regulator among the plurality of current regulators. Wherein, a first PWM signal and a second PWM signal among the plurality of PWM signals have different duty cycles for generating substantially identical brightness on corresponding LED strings among the plurality of LED strings in the same frame period.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
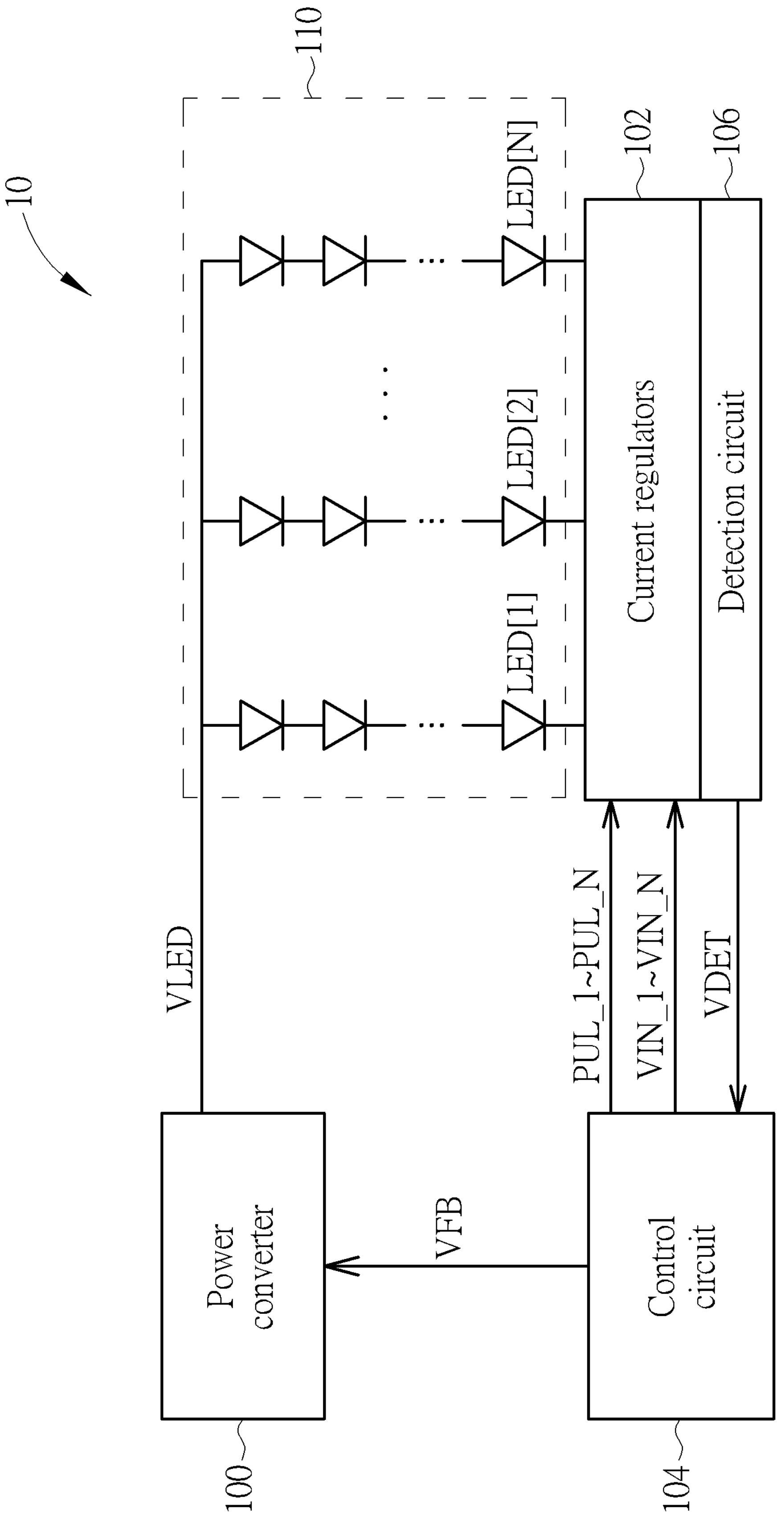
FIG. 1 is a schematic diagram of a display system according to an embodiment of the present invention.

FIG. 1 is a schematic diagram of a display system 10 according to an embodiment of the present invention. The display system 10 includes a power converter 100, a plurality of current regulators 102, a control circuit 104, a detection circuit 106 and a display panel 110. The display panel 110 may be a light-emitting diode (LED) panel composed of a plurality of LEDs, which may emit light to show desired images under appropriate controls of the power converter 100, the current regulators 102 and the control circuit 104. As shown in FIG. 1, the LEDs may be arranged as an array, where each column of LEDs are connected in series to form an LED string which is controlled by one of the current regulators 102. The anode of the topmost LED in each LED string is coupled to the power converter 100, and the cathode of the bottommost LED in each LED string is coupled to the corresponding current regulator.

The power converter 100 is configured to output a power voltage VLED to the LEDs on the display panel 110. The power converter 100 may supply the power voltage VLED by using, for example, any type of voltage regulator such as a DC-DC converter. The current regulators 102 are configured to control the currents flowing through the LED strings, where the current magnitude may determine the brightness of the LEDs. The control circuit 104 is configured to control the operations of the power converter 100 and the current regulators 102, so as to control the LEDs on the display panel 110. More specifically, there may be N channels of LED strings (i.e., LED[1]-LED[N]) on the display panel 110, and each channel is controlled by one of the current regulators 102. The control circuit 104 may output pulse width modulation (PWM) signals PUL_1-PUL_N and input voltages VIN_1-VIN_N to respective current regulators 102 for the N channels. In an embodiment, the control circuit 104 may generate digital voltage values, which are converted into the input voltages VIN_1-VIN_N through one or more digital-to-analog converters (DACs) (not illustrated).

As shown in FIG. 1, the display system 10 may further include a detection circuit 106, which is coupled to the current regulators 102 and configured to detect the operating voltages of the current regulators 102. In general, the current regulators 102 may operate normally within a normal operation range, and the voltage received by the current regulators 102 (i.e., the power voltage VLED minus the cross voltage of the LED strings) should be within the normal operation range. The detection circuit 106 may further output a detection signal VDET to the control circuit 104, where the detection signal VDET indicates whether the operating voltage of each of the current regulators 102 is within its normal operation range. If the detection circuit 106 detects that the operating voltages received by one or more current regulators fall below the normal operation range, the output detection signal VDET may inform the control circuit 104 of this information. Accordingly, the control circuit 104 may output a feedback signal VFB to the power converter 100, to control the power converter 100 to increase the power voltage VLED and/or adjust the input voltage(s) for the target current regulator(s), allowing the current regulators 102 to enter their normal operation range. In a similar manner, the control circuit 104 may control the power converter 100 to decrease the power voltage VLED if the detection circuit 106 detects that the operating voltage of any of the current regulators 102 is too high to be above the normal operation range.

Figure 2:
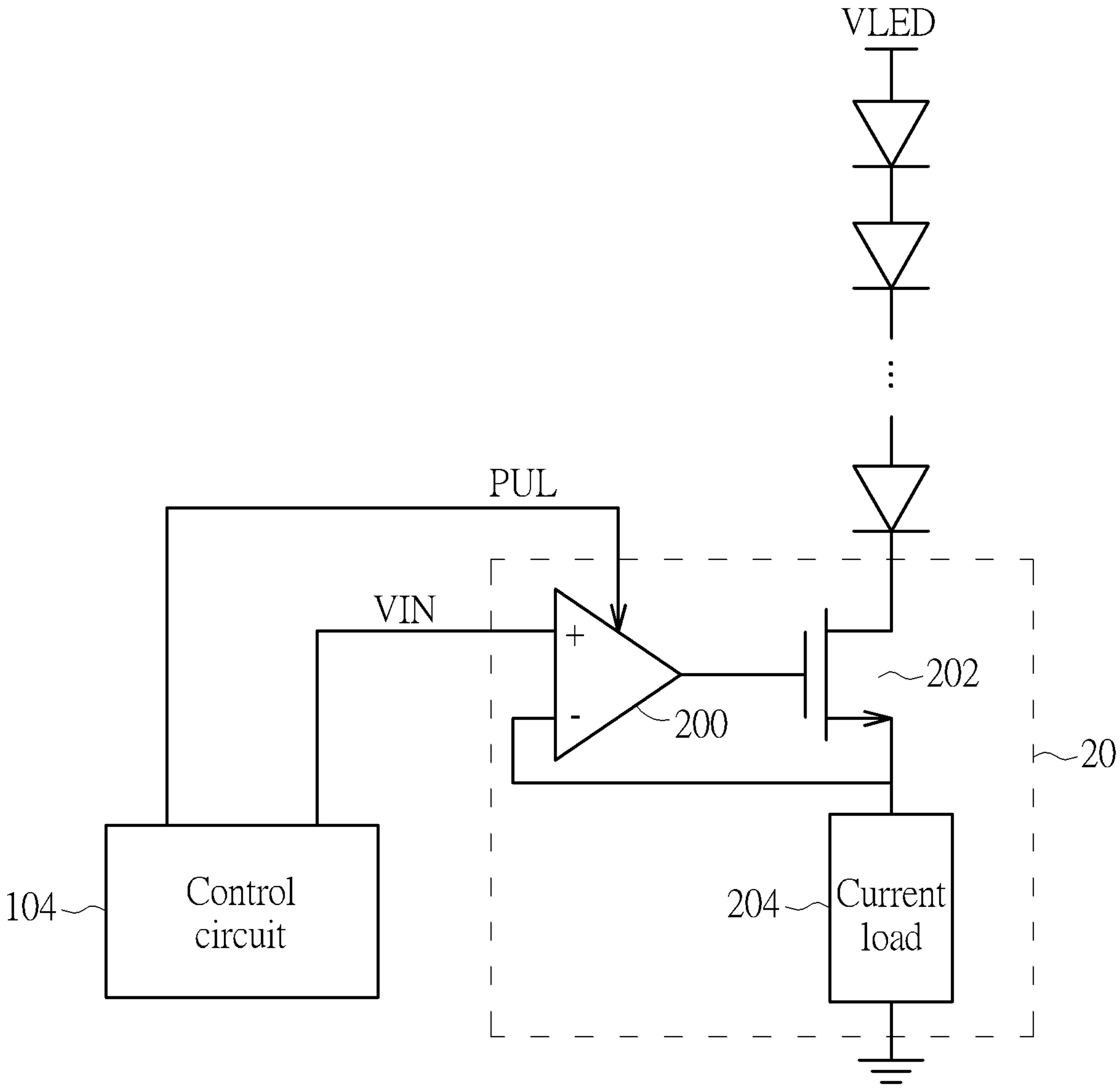
FIG. 2 illustrates detailed implementations and operations of a current regulator.

FIG. 2 illustrates detailed implementations and operations of a current regulator 20, which may be one of the current regulators 102 shown in FIG. 1, for controlling an LED string on the display panel 110. The current regulator 20 includes an amplifier 200, a power transistor 202 and a current load 204. The current load 204 may include one or more resistors, or include one or more circuit elements such as transistor(s) that may generate equivalent resistance. The power transistor 202 may be a metal-oxide semiconductor (MOS) transistor or a bipolar junction transistor (BJT). In this embodiment, the power transistor 202 is an N-type MOS (NMOS) transistor, of which the source terminal is coupled to the current load 204 and the drain terminal is coupled to the LED string. The gate terminal of the power transistor 202 is coupled to the amplifier 200, for receiving a control signal from the amplifier 200. The amplifier 200, which may be an operational amplifier, is configured to lock the source voltage of the power transistor 202, so as to determine the current value output to the LED string under the constant resistance generated by the current load 204. The current value may further be used to determine the brightness emitted by the LEDs.

Note that there are multiple current regulators 102 for controlling the display panel 110, where each current regulator 20 is coupled to and configured to drive one LED string with the implementation as shown in FIG. 2. The control circuit 104 may control the current regulators 102 by outputting respective input voltage VIN and PWM signal PUL to the amplifier 200 of each current regulator 20.

The brightness of an LED in a frame may be determined based on the average current flowing through the LED in the frame period, where the average current may be determined based on the current magnitude provided from the current regulator 20 and the pulse width for controlling the turn-on time of the power transistor 202 in the current regulator 20. The control circuit 104 is responsible to control the current magnitude by outputting the input voltage VIN and control the pulse width by adjusting the duty cycle of the PWM signal PUL, so as to generate appropriate brightness. For example, the duty cycle 30% may control the power transistor 202 to be on in 30% of the frame period and off in 70% of the frame period. In an embodiment, in order to control the power transistor 202 appropriately, the gate terminal of the power transistor 202 may further be coupled to a switch and a pull-low path, or the amplifier 200 may include a pull-low path in its output terminal. The pull-low path may pull low the gate voltage to turn off the power transistor 202 when the amplifier 200 is disabled by receiving the PWM signal PUL in "Low" level. The detailed implementations and operations of turning the power transistor 202 on or off should be well known by a person of ordinary skill in the art, and will not be narrated herein.

Figure 3:
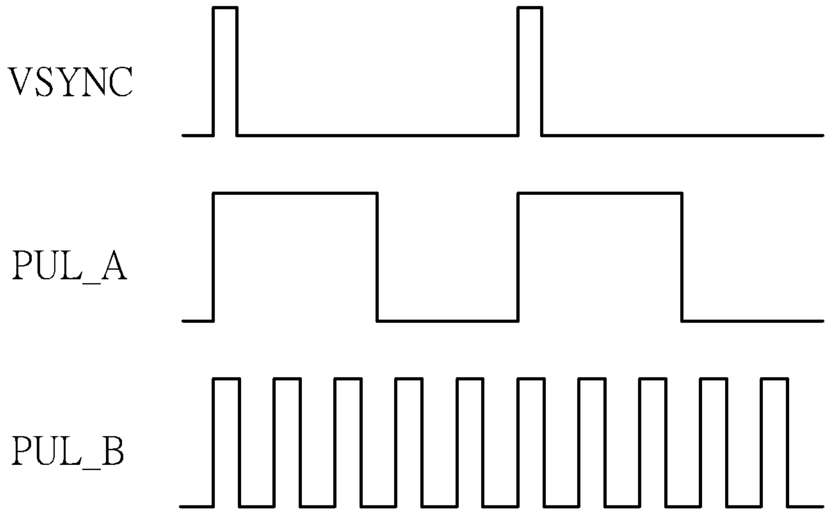
FIG. 3 illustrates several implementations of the PWM signal.

Note that the PWM signal PUL may include a plurality of pulses, and there may be one or more pulses in the PWM signal PUL in each frame period. FIG. 3 illustrates several implementations of the PWM signal PUL. In an embodiment, the PWM signal PUL_A has one pulse in each frame period defined by the vertical synchronization signal VSYNC. The control circuit 104 may control the pulse width of the PWM signal PUL_A to generate the desired duty cycle. In another embodiment, in order to increase the refresh rate, the PWM signal PUL_B may have multiple pulses in each frame period, as shown in FIG. 3. As mentioned above, there may be multiple LED strings deployed on the display panel 110, and thus the control circuit 104 should output multiple PWM signals PUL_1-PUL_N to the current regulators 102 for driving the LED strings. Each PWM signal PUL_1-PUL_N may have a single pulse or multiple pulses in each frame period, as the PWM signal PUL_A or PUL_B shown in FIG. 3.

Therefore, the power converter 100 has to face heavy loading since it is configured to output the power voltage VLED to a great number of LEDs on the display panel 110. In the prior art, the PWM signals used for the LED strings are switched synchronously, which turn on/off all the current regulators 102 at the same time, such that a heavy load may appear at the turn-on time of the current regulators 102, resulting in a large burden on the power converter 100 and generating a significant drop on the power voltage VLED.

In order to solve this problem and improve the stability of the power voltage VLED, in an embodiment of the present invention, the PWM signals PUL_1-PUL_N for the LED strings in different channels may be scrambled during one or more frame periods. Further, as for each PWM signal PUL_1-PUL_N, the arrangements of pulses in one frame period may also be scrambled if there are multiple pulses included in the frame period. This operation provides random and small-scale variations to adjust the start-time, end-time, and/or width of the pulses. Since the pulse widths are modified randomly, the overall duty cycle for each current regulator or each LED string may converge to a target value, so that the variation of pulse widths will not cause the LEDs' brightness to change severely, which may not be easily noticed by human eyes.

Figure 4:
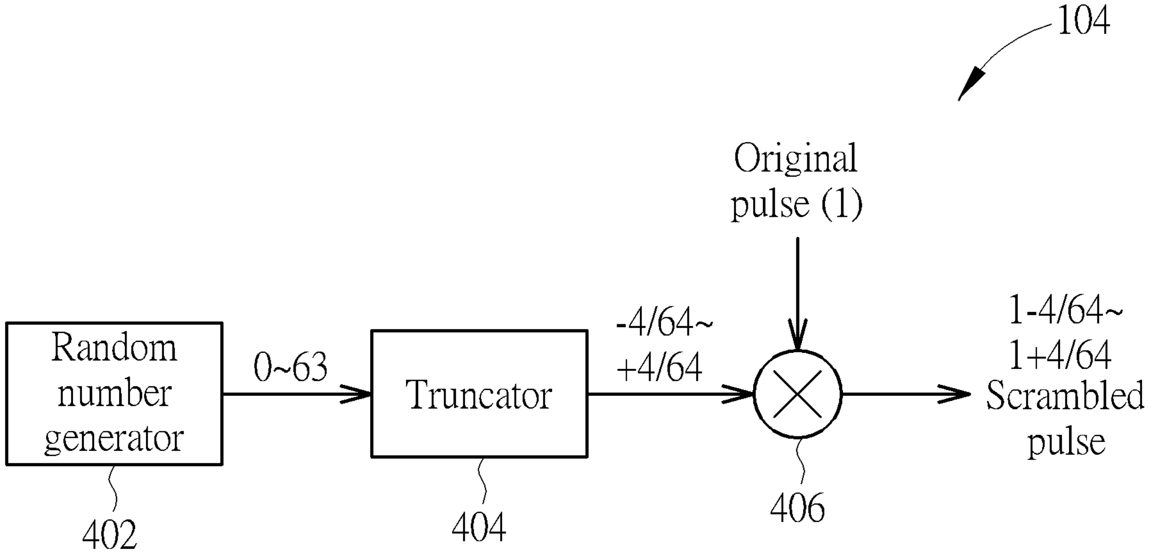
FIG. 4 illustrates an exemplary implementation of the control circuit used to generate the random PWM signals.

FIG. 4 illustrates an exemplary implementation of the control circuit 104 used to generate the random PWM signals PUL_1-PUL_N. As shown in FIG. 4, the control circuit 104 may include a random number generator 402, a truncator 404 and a combiner 406. The random number generator 402 is configured to generate a plurality of random variables, which are used for randomly modifying an original pulse to generate the scrambled pulses in the PWM signals PUL_1-PUL_N. In an embodiment, the random number generator 402 may be a pseudo random binary sequence (PRBS) generator, which is configured to generate a random binary sequence. For example, a 6-bit PRBS may generate a 6-bit sequence as denoted by values 0~63. Since the variations of the PWM signals PUL_1-PUL_N cannot be too large to be noticed by human eyes, a truncator 404 may be used to truncate the random variables, to generate residual values within a smaller range such as −4~+4, which may further be shifted to generate random values between −4/64 and +4/64. Therefore, the combiner 406 may combine the original pulse (which has 1 unit of width) with the random values from −4/64 to +4/64, to generate a scrambled pulse having a random pulse width ranging from 1−4/64 to 1+4/64 units.

Figure 5:
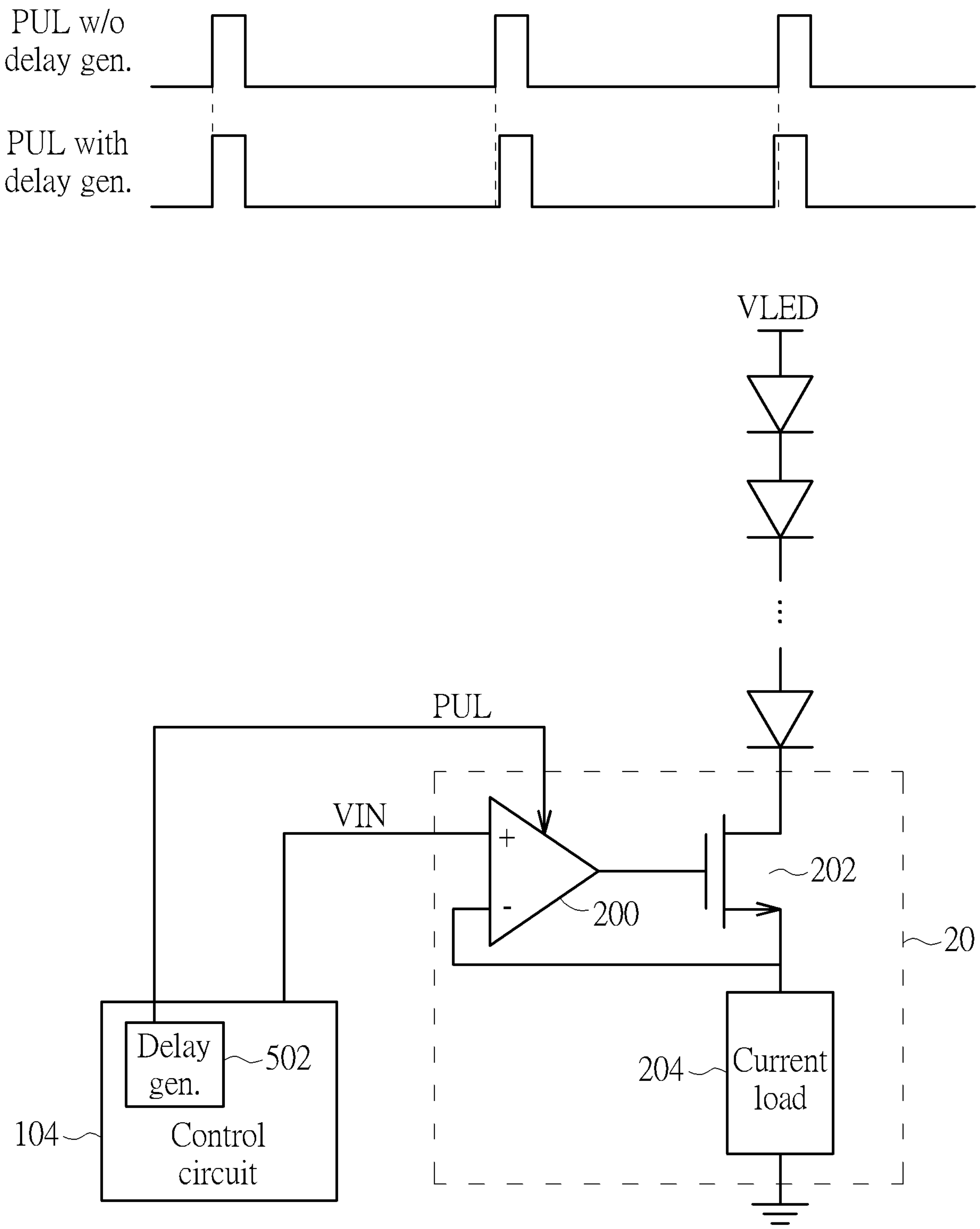
FIG. 5 is a schematic diagram of a delay generator configured to adjust the PWM signal to be output to the current regulator according to an embodiment of the present invention.

In an embodiment, the random variables of the random number generator 402 may be used to control a delay generator 502 to adjust the start time, end time and/or pulse width of the pulses in the PWM signal PUL to be output to the current regulator 20, as shown in FIG. 5. The delay generator 502 may be included in the control circuit 104 or coupled to the control circuit 104, to cooperate with the random number generator 402. In this embodiment, the pulses may be shifted forward or backward by applying a longer or shorter delay time generated by the delay generator 502. The random adjustment of delay times may be applied to the start time of the pulse, the end time of the pulse, or both. Therefore, the widths of different pulses after random adjustment may be the same or different. In an embodiment, different pulses may be included in one frame period; that is, a frame period may include multiple pulses to increase the refresh rate (e.g., as the PWM signal PUL_B shown in FIG. 3), and the widths of multiple pulses in one frame period may be adjusted or delayed randomly, e.g., with several longer pulses and several shorter pulses. The random variations on the pulse widths may still generate approximately correct brightness in this frame if the average pulse width can reach a target duty cycle for generating the desired brightness in this frame. Alternatively, different pulses may be of different image frames, where the brightness may not deviate too much under small enough pulse variations.

As mentioned above, the control circuit 104 is configured to control multiple current regulators 102 for the LED strings in different channels. Therefore, the PWM signals PUL_1-PUL_N simultaneously output to different channels may further be applied with different delay times, so as to stagger the on-time and/or off-time of different power transistors 202 in the current regulators 102. For example, the delay generator 502 may provide different delay times for a first pulse and a second pulse respectively included in different PWM signals output to different current regulators 102, so that the first pulse and the second pulse may be output with a slight time difference even if these two pulses are simultaneously output in the same frame period.

The above staggering operation allows the current regulators 102 to draw currents at different time points, which leads to loading reduction for the power converter 100 and also mitigates the electromagnetic interference (EMI) problem. As for the EMI issue, if all the current regulators 102 are turned on/off with the same frequency, large EMI energies may appear on this frequency. In contrast, according to the present invention, the current regulators 102 are turned on/off at different time points with different frequencies under scrambled PWM control, so that the energies may be spread over a wider range of frequency band, thereby reducing the EMI problem.

In the above embodiment, the random adjustment of PWM signals is feasible only when the variation degree is small, to prevent the display image from being influenced. In another embodiment, the PWM signal PUL may be modified in a predetermined manner, and the corresponding input voltage VIN for the current regulator may be adjusted accordingly to make the brightness uniform.

In order to control the current regulators 102 to output different currents corresponding to the PWM signals PUL_1-PUL_N, the control circuit 104 may output the input voltages VIN_1-VIN_N to the current regulators 102, where the values of the input voltages VIN_1-VIN_N may be determined according to the corresponding current magnitude to be generated by each of the current regulators. Therefore, according to the duty cycle of the PWM signal PUL_1-PUL_N in each channel, the control circuit 104 may determine the value of each of the input voltages VIN_1-VIN_N. As a result, the current regulators 102 may generate and output the driving current for each channel to be adapted to the duty cycle and the desired brightness.

In general, in order to achieve identical brightness, when the duty cycle of the PWM signal PUL_1 output to the first channel is greater than the duty cycle of the PWM signal PUL_2 output to the second channel, the driving current output to the first channel may be smaller than the driving current output to the second channel. Accordingly, the input voltage VIN_1 provided for the current regulator of the first channel may be smaller than the input voltage VIN 2 provided for the current regulator of the second channel under the constant current load 204 of the current regulators. For example, suppose that the LEDs in the first channel and the second channel are configured to generate substantially identical brightness in the same frame period. The PWM signal PUL_1 output to the first channel may have a duty cycle of 50% while the corresponding current regulator is configured to generate a current equal to 10 mA. If the duty cycle of another PWM signal PUL2 output to the second channel is adjusted to 25%, the corresponding current regulator may generate a current approximately equal to 20 mA, so as to achieve the same brightness.

Figure 6:
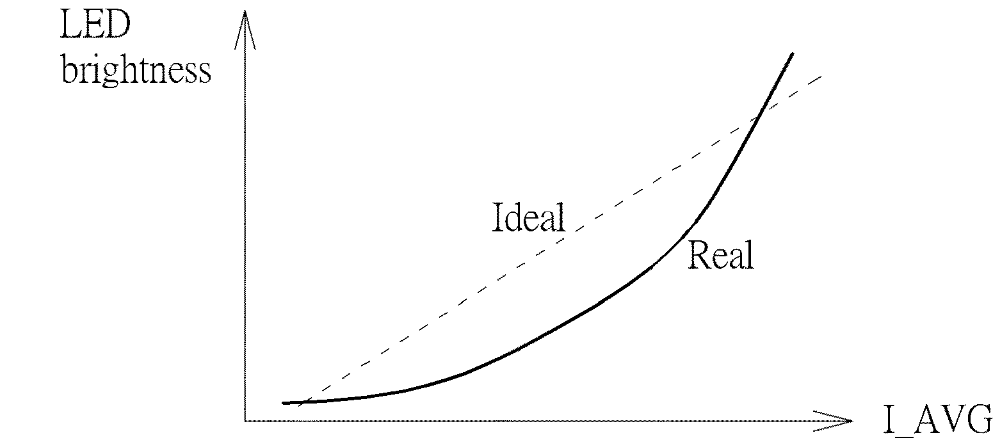
FIG. 6 illustrates the relationship of the brightness of the LED with respect to an average current flowing through the LED.

The above calculation of driving current versus pulse width is based on the ideal assumption that the current flowing through the LED is linearly proportional to the LED's brightness. However, in a real case, the relationship of brightness and current is usually nonlinear in most LED panels due to the characteristics of the LEDs. FIG. 6 illustrates the relationship of the brightness of the LED with respect to an average current I_AVG flowing through the LED. Due to the nonlinear relationship between brightness and current, if the pulse width is divided by 2, doubling the output current of the current regulator may not achieve the desired brightness.

Figure 7:
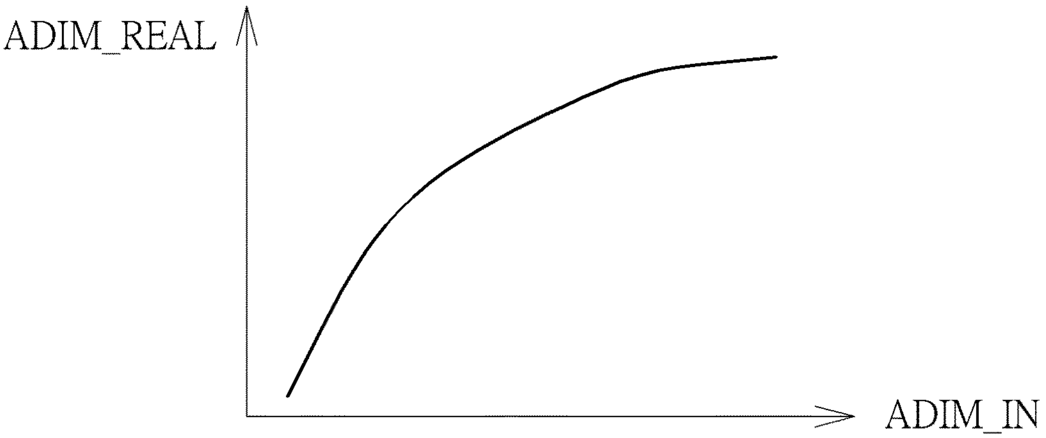
FIG. 7 illustrates a brightness calibration curve according to an embodiment of the present invention.

In an embodiment, after the current is calculated based on the pulse width or duty cycle, the current may further be calibrated to generate the desired brightness. The calibration may be performed based on a brightness calibration curve, as shown in FIG. 7. This brightness calibration curve may be obtained by inverting the current-to-brightness curve shown in FIG. 6.

Figure 8:
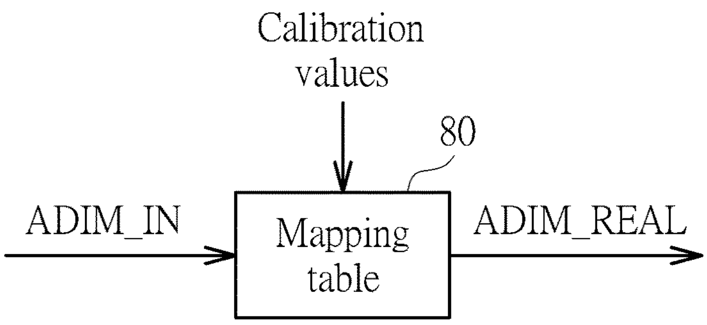
FIG. 8 is a schematic diagram of a mapping table for performing current calibration according to an embodiment of the present invention.

FIG. 8 is a schematic diagram of a mapping table 80 for performing current calibration according to an embodiment of the present invention. The above brightness calibration curve may be implemented as values stored in the mapping table 80 to be included in a memory. The memory may be included in the control circuit 104 or may be a stand-alone memory device coupled to the control circuit 104. In an embodiment, the values of the brightness calibration curve may be written into the mapping table 80 through a one-time-programming (OTP) operation such as electronic fuse (eFUSE).

In an embodiment, the control circuit 104 may first calculate a dimming value for the input voltage VIN according to the duty cycle of the corresponding PWM signal. For example, when the duty cycle is divided by 2, the calculated dimming value may be used to generate double current. Subsequently, the control circuit 104 calibrates the dimming value by referring to the mapping table 80; that is, this dimming value may serve as the input dimming value ADIM_IN to be received by the mapping table 80. After calibration, the mapping table 80 may correspondingly output an output dimming value ADIM_REAL corresponding to the real brightness. The control circuit 104 then generates the value of the input voltage VIN to be output to the current regulator 20 according to the output dimming value ADIM_REAL. For example, the control circuit 104 may output the output dimming value ADIM_REAL to a DAC, and the DAC generates the input voltage VIN for the current regulator 20 based on the output dimming value ADIM_REAL; hence, the current regulator 20 may generate and output an appropriate current value for generating the desired brightness.

As mentioned above, the control circuit 104 may output the input voltages VIN_1-VIN_N to multiple current regulators 102 in different channels. The same calibration operation may be applied to determine each of the input voltages VIN_1-VIN_N. In addition, the control circuit 104 may control the pulses of the PWM signals PUL_1-PUL_N to be scrambled between different channels, and correspondingly adjust the input voltages VIN_1-VIN_N to change the driving currents.

Therefore, suppose that the LEDs in the first channel and the second channel are configured to generate the same brightness in the same frame period. The PWM signal PUL_1 output to the first channel may have a duty cycle of 50% while the corresponding current regulator is configured to generate a current equal to 10 mA. If the duty cycle of another PWM signal PUL_2 output to the second channel is adjusted to 25%, the corresponding current regulator may generate a current equal to 22 mA after calibration (e.g., from 20 mA to 22 mA), so as to achieve identical brightness. The calibration may be performed in the control circuit 104 by adjusting the dimming value based on the mapping table 80, the dimming value is then converted into the voltage output to the current regulator 20, and this voltage is used to determine the driving current output to the LED string.

As mentioned above, the detection circuit 106 of the display system 10 is configured to detect whether the current regulators 102 operate in the normal operation range. The change of driving currents may alter the cross voltage of the LED string, thereby altering the operating voltage of the current regulator, and it is possible that the operating voltage falls beyond its normal operation range after the adjustments of driving currents due to the changes of duty cycles.

Figure 9:
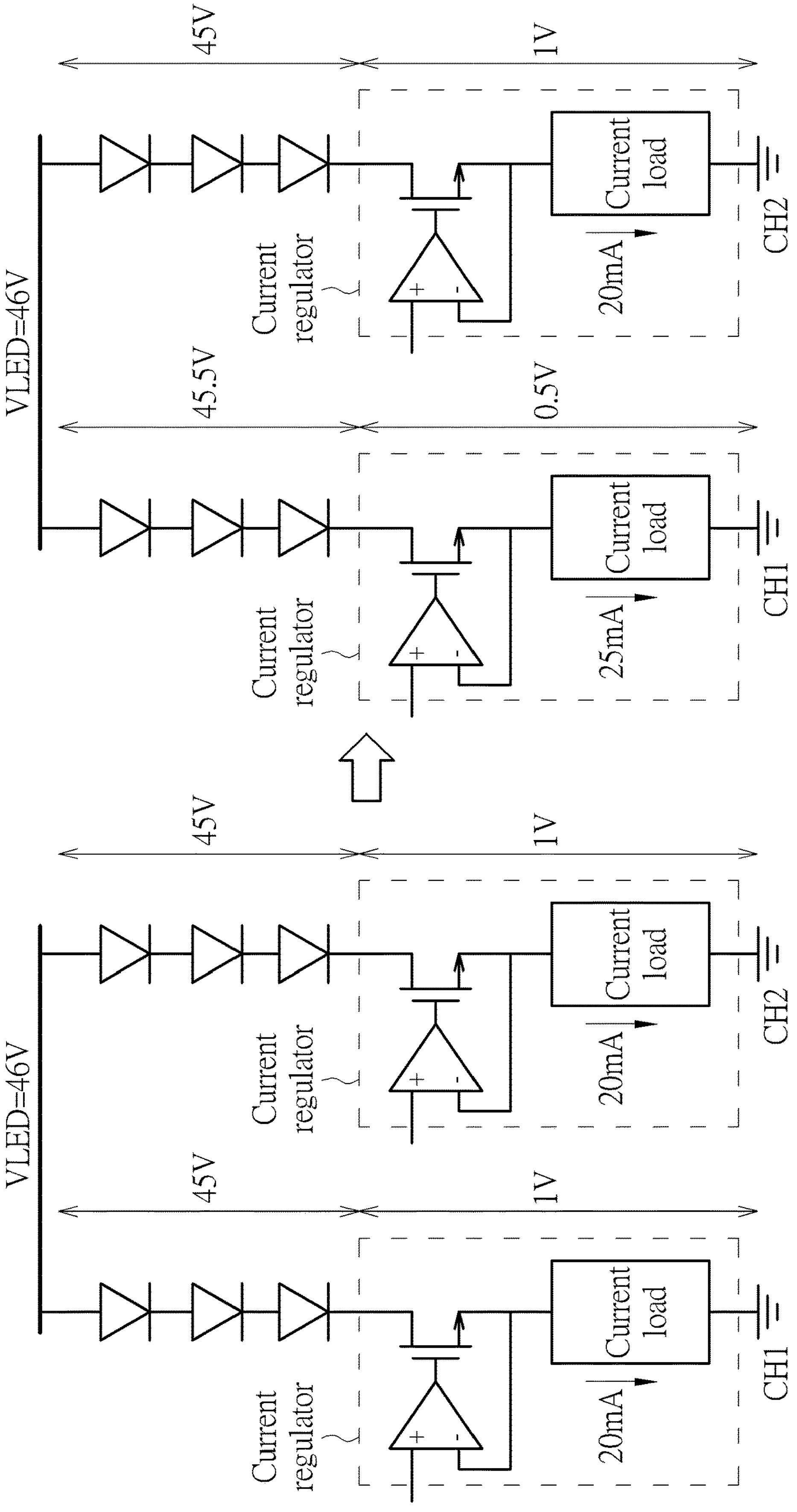
FIG. 9 illustrates that the current adjustment causes the current regulator to depart from its normal operation range.

FIG. 9 illustrates that the current adjustment causes the current regulator to depart from its normal operation range. Suppose that the current regulator is operable by receiving a supply voltage higher than 0.8V. As shown in FIG. 9, originally the channels CH1 and CH2 have a driving current 20 mA, and the power voltage VLED is equal to 46V. Therefore, the cross voltage of the LED string is 45V, and the cross voltage of the current regulators in the channels CH1 and CH2 is 1V which is greater than 0.8V and thus the current regulators can operate normally.

When the first channel CH1 is configured with a smaller pulse width while outputting a higher driving current 25 mA, the driving current 25 mA may cause the LED string to have a higher cross voltage (i.e., 45.5V), which suppresses the operating voltage of the current regulator to 0.5V, below the minimum operable voltage 0.8V of the current regulator.

Figure 10:
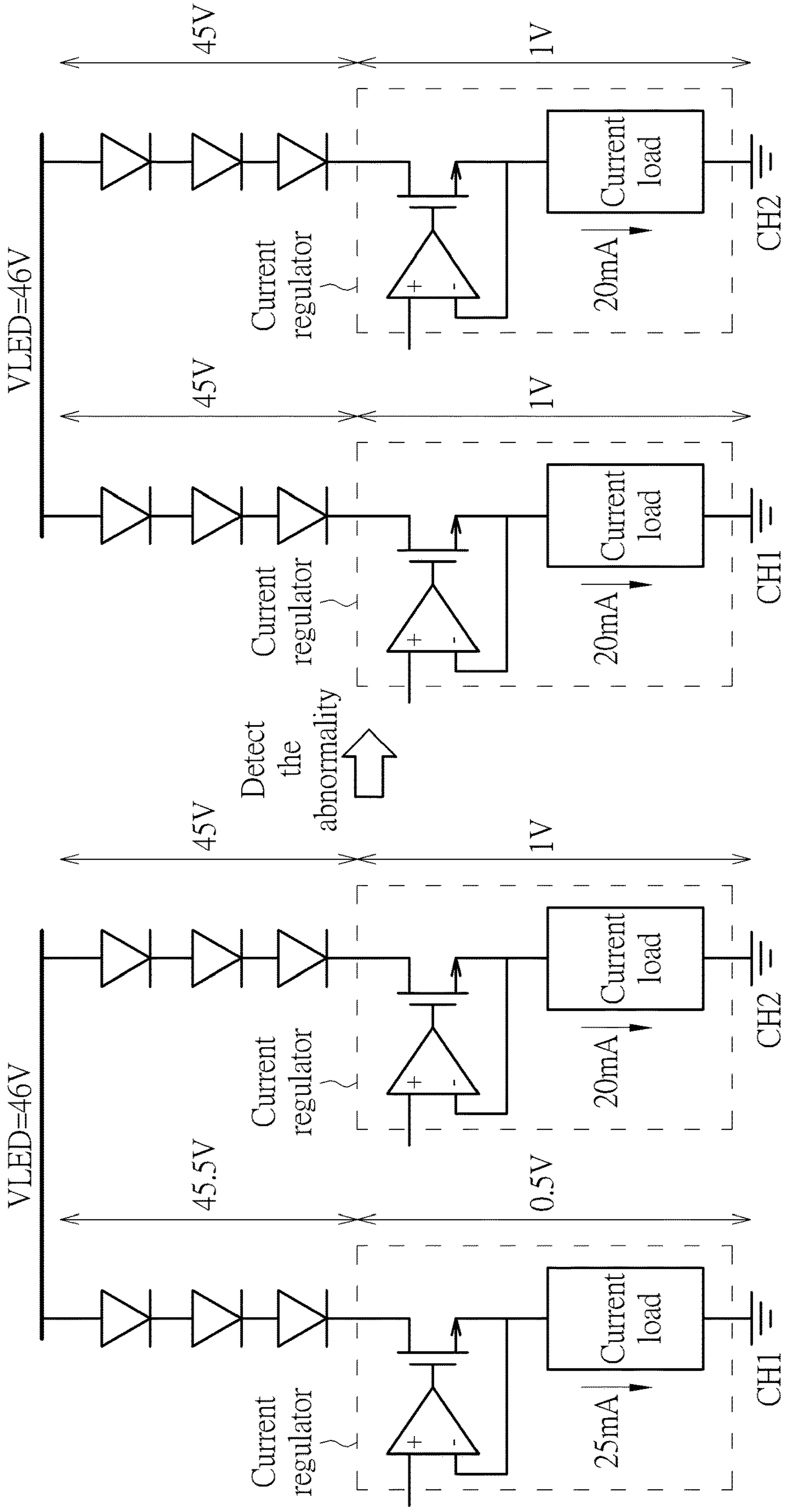
FIG. 10 illustrates that the channel returns to its previous state when the detection circuit detects that the current regulator falls below its normal operation range.

In an embodiment, when the detection circuit 106 detects the problem that the operating voltage of any current regulator falls below its normal operation range, the detection circuit 106 may inform the control circuit 104 of this problem, e.g., by outputting the detection signal VDET. In response, the control circuit 104 may control the channel to return to its previous state. For example, as shown in FIG. 10, the current regulator of the channel CH1 fails to operate normally after the driving current rises to 25 mA. When the detection circuit 106 detects the abnormality of the current regulator, it may recover the previous value of the input voltage for the current regulator, so that the current regulator and the corresponding channel may return to its previous state. Alternatively, the control circuit 104 may control the power converter 100 to increase the power voltage VLED, so as to increase the cross voltage of the current regulator to make the current regulator operate normally.

As a result, the staggered or scrambled PWM signals may be applied to all of the channels in the display panel, or only applied to several channels. For example, certain channels having the problem that the current regulator cannot operate normally due to the current variation may use the original setting with the fixed pulse width and driving current in one or more frame periods.

Please note that the present invention aims at providing a novel driving method for controlling the LED display panel. Those skilled in the art may make modifications and alterations accordingly. In a first embodiment of the present invention, the start time, end time and/or pulse width of the PWM signals may be adjusted randomly with small variations. The average current after adjustment may be the same as or different from that before adjustment under the random variations. The variations of duty cycle may be small and will not evidently influence the image display. In a second embodiment of the present invention, the pulse width may be adjusted or modified with a greater degree, where the output current and corresponding voltage are modified to control the overall brightness to remain unchanged. The average current after adjustment may be the same as that before adjustment with well control and calibration of the voltage value to be output to the current regulator.

Figure 11:
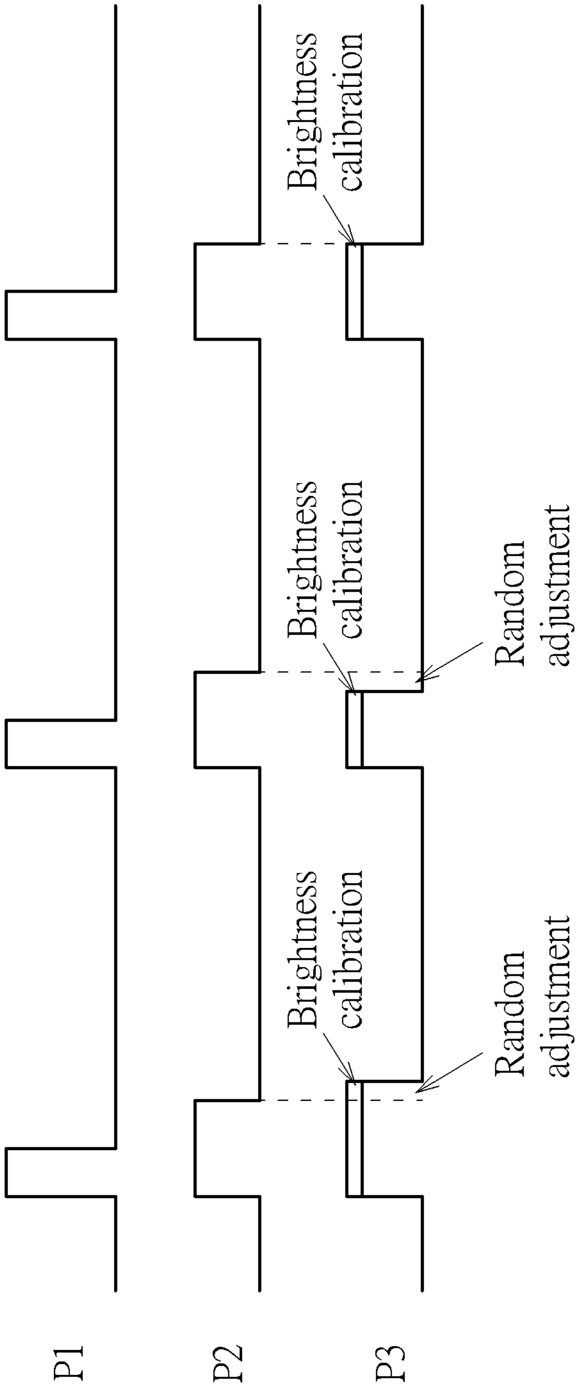
FIG. 11 is a waveform diagram of different PWM signals according to embodiments of the present invention.

In another embodiment, the above two implementations may be combined to generate a more random result, as shown in FIG. 11. FIG. 11 shows a PWM signal P1 before adjustment, a PWM signal P2 after predetermined adjustments of pulse width and input voltage, and a PWM signal P3 having further random adjustments. In this embodiment, the original PWM signal P1 is adjusted by increasing the pulse width and decreasing the corresponding input voltage (denoted by a decrease of pulse height) to generate the PWM signal P2, which has the same average current as the PWM signal P1 and thus generates the same brightness. Subsequently, a random variation of duty cycle is further incorporated in the PWM signal P2 to generate the PWM signal P3, so as to scramble and scatter the pulses between multiple PWM signals. In the PWM signal P3, the adjustment of input voltage is optionally applied for brightness calibration.

To sum up, the present invention provides a display driver circuit and a related driving method for controlling an LED panel. The LED panel includes multiple current regulators each coupled to an LED string on the panel. The control circuit may output a PWM signal and an input voltage to each of the current regulators, to control the current regulator to output a driving current to the corresponding LED string to perform light emission. The average driving current is determined based on the duty cycle of the PWM signal and the magnitude of the input voltage. In an embodiment, the pulses of the PWM signal may be scrambled. Therefore, the pulses of multiple PWM signals for different current regulators are scattered with small variations, so that the loading of the power converter may be reduced and the EMI problem may be mitigated. In another embodiment, the duty cycle of the PWM signal may be well controlled and modified, and the value of the input voltage may be adjusted accordingly, to generate a target average driving current capable of generating desired brightness. This allows a larger degree of duty cycle adjustment, and the adjustment will not influence the image display.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display driver circuit for controlling a display panel having a plurality of light-emission diode (LED) strings, the display driver circuit comprising:

a plurality of current regulators, each configured to control one of the plurality of LED strings; and a control circuit, coupled to the plurality of current regulators, configured to generate a plurality of pulses in a plurality of pulse width modulation (PWM) signals and output each of the plurality of PWM signals to a respective current regulator among the plurality of current regulators;

wherein the plurality of pulses are scrambled.

2. The display driver circuit of claim 1, wherein the control circuit comprises:

a random number generator, configured to generate a plurality of random variables for randomly modifying an original pulse to generate the plurality of scrambled pulses.

3. The display driver circuit of claim 2, wherein the control circuit further comprises:

a delay generator, coupled to the random number generator, configured to delay at least one of a start time and an end time of the plurality of pulses according to the plurality of random variables.

4. The display driver circuit of claim 3, wherein the delay generator is configured to provide different delay times for a first pulse and a second pulse among the plurality of pulses.

5. The display driver circuit of claim 2, wherein the control circuit further comprises:

a truncator, coupled to the random number generator, configured to truncate the plurality of random variables to generate a plurality of residual values, which are used for generating the plurality of scrambled pulses.

6. The display driver circuit of claim 1, further comprising:

a detection circuit, coupled to the plurality of current regulators, configured to detect a plurality of operating voltages of the plurality of current regulators, and output a detection signal indicating whether each of the plurality of operating voltages is within a normal operation range of the plurality of current regulators to the control circuit.

7. The display driver circuit of claim 6, further comprising:

a power converter, configured to output a power voltage to the display panel;

wherein the control circuit is further configured to output a feedback signal to the power converter according to the detection signal, and the feedback signal controls the power converter to adjust the power voltage.

8. The display driver circuit of claim 6, wherein when the detection circuit detects that a first current regulator among the plurality of current regulators fails to operate normally, the control circuit is further configured to recover a previous value of an input voltage for the first current regulator.

9. The display driver circuit of claim 1, wherein the plurality of scrambled pulses are respectively output to the plurality of LED strings in the same frame period.

10. A display driver circuit for controlling a display panel having a plurality of light-emission diode (LED) strings, the display driver circuit comprising:

a plurality of current regulators, each configured to control one of the plurality of LED strings; and a control circuit, coupled to the plurality of current regulators, configured to generate a plurality of pulse width modulation (PWM) signals and output each of the plurality of PWM signals to a respective current regulator among the plurality of current regulators;

wherein a first PWM signal and a second PWM signal among the plurality of PWM signals have different duty cycles for generating substantially identical brightness on corresponding LED strings among the plurality of LED strings in the same frame period.

11. The display driver circuit of claim 10, wherein the control circuit is further configured to generate a plurality of input voltages and output each of the plurality of input voltages to the respective current regulator among the plurality of current regulators.

12. The display driver circuit of claim 11, wherein the control circuit is further configured to determine values of the plurality of input voltages according to the duty cycles of the plurality of PWM signals.

13. The display driver circuit of claim 12, wherein the control circuit is further configured to perform the following steps to determine the values of the plurality of input voltages:

calculating a dimming value for the plurality of input voltages according to the duty cycles of the plurality of PWM signals; and calibrating the dimming value by referring to a mapping table, to generate the values of the plurality of input voltages;

wherein the mapping table is determined according to a relationship between brightness generated by the plurality of LED strings and currents flowing through the plurality of LED strings.

14. The display driver circuit of claim 11, wherein a first input voltage output to a first current regulator among the plurality of current regulators is smaller than a second input voltage output to a second current regulator among the plurality of current regulators when the duty cycle of the first PWM signal output to the first current regulator is greater than the duty cycle of the second PWM signal output to the second current regulator.

15. The display driver circuit of claim 10, further comprising:

a detection circuit, coupled to the plurality of current regulators, configured to detect a plurality of operating voltages of the plurality of current regulators, and output a detection signal indicating whether each of the plurality of operating voltages is within a normal operation range of the plurality of current regulators to the control circuit.

16. The display driver circuit of claim 15, further comprising:

a power converter, configured to output a power voltage to the display panel;

wherein the control circuit is further configured to output a feedback signal to the power converter according to the detection signal, and the feedback signal controls the power converter to adjust the power voltage.

17. The display driver circuit of claim 15, wherein when the detection circuit detects that a first current regulator among the plurality of current regulators fails to operate normally, the control circuit is further configured to recover a previous value of an input voltage for the first current regulator.

* * * * *